(12) United States Patent
Hamilton

(10) Patent No.: US 7,068,724 B1
(45) Date of Patent: Jun. 27, 2006

(54) METHOD AND APPARATUS FOR INSERTING DIGITAL MEDIA ADVERTISEMENTS INTO STATISTICAL MULTIPLEXED STREAMS

(75) Inventor: Jeffrey S. Hamilton, Doylestown, PA (US)

(73) Assignee: Prime Research Alliance E., Inc., Tortola (VG)

( * ) Notice: Subject to any disclaimer, the term of this patent is extended or adjusted under 35 U.S.C. 154(b) by 736 days.

(21) Appl. No.: 09/694,848

(22) Filed: Oct. 20, 2000

Related U.S. Application Data

(60) Provisional application No. 60/160,549, filed on Oct. 20, 1999.

(51) Int. Cl.
*H04N 7/12* (2006.01)
*H04N 11/02* (2006.01)

(52) U.S. Cl. .................. 375/240.26; 725/32; 725/36

(58) Field of Classification Search ................ 370/468, 370/477, 538; 725/36, 32, 34, 35, 95; 375/240.01, 375/240.03; 348/385.1
See application file for complete search history.

(56) References Cited

U.S. PATENT DOCUMENTS

| | | | |
|---|---|---|---|
| 5,029,014 A | 7/1991 | Lindstrom | |
| 5,155,591 A | 10/1992 | Wachob | 358/86 |
| 5,231,494 A | 7/1993 | Wachob | |
| 5,424,770 A | 6/1995 | Schmelzer | |
| 5,534,944 A | 7/1996 | Egawa et al. | 348/584 |
| 5,559,549 A | 9/1996 | Hendricks | |
| 5,600,366 A | 2/1997 | Schulman | 348/9 |
| 5,612,742 A | 3/1997 | Krause | |
| 5,636,346 A | 6/1997 | Saxe | |
| 5,652,615 A | 7/1997 | Bryant | |
| 5,661,516 A | 8/1997 | Carles | |
| 5,687,095 A * | 11/1997 | Haskell et al. | 348/386.1 |
| 5,708,664 A * | 1/1998 | Budge et al. | 370/538 |
| 5,715,018 A | 2/1998 | Fasciano et al. | 348/722 |
| 5,724,091 A | 3/1998 | Freeman et al. | 348/13 |
| 5,774,170 A | 6/1998 | Hite | |
| 5,812,790 A | 9/1998 | Randall | |
| 5,859,660 A | 1/1999 | Perkins et al. | 348/9 |
| 5,861,919 A | 1/1999 | Perkins | |
| 5,862,140 A | 1/1999 | Shen et al. | 370/468 |

(Continued)

FOREIGN PATENT DOCUMENTS

CA 2264392 1/1999

(Continued)

OTHER PUBLICATIONS

"Digital Program Insertion", SCTE DVS078, Mar. 17, 1997.
"Digital Ad Insertion Request for Information", Cable Television Laboratories, Inc. ("CableLabs"), Apr. 28, 1997.

(Continued)

*Primary Examiner*—Gims Philippe
*Assistant Examiner*—Erick Rekstad
(74) *Attorney, Agent, or Firm*—Technology, Patents & Licensing, Inc.

(57) ABSTRACT

A method and system for the insertion of local signals, including digital media advertisements, into statistically multiplexed streams is presented. The rate control and timing information is computed and is used to specify the insertion time and rate parameters for digital advertisements. In one embodiment, a maximum bit rate over the advertisement duration is specified. The maximum bit rate may be constant or may vary in time, such that high bit rate portions of the advertisement are supported. High bit rate portions of the advertisements in different program streams may be staggered, such that the total bandwidth required does not exceed a maximum, but allowing for high bit rate portions of advertisements. Custom bit rate profiles for advertisements may also be defined, with the profiles being defined at a high granularity or a low granularity.

6 Claims, 5 Drawing Sheets

U.S. PATENT DOCUMENTS

| | | | |
|---|---|---|---|
| 5,864,823 | A | 1/1999 | Levitan |
| 5,886,731 | A | 3/1999 | Ebisawa |
| 5,889,950 | A | 3/1999 | Kuzma |
| 5,917,830 | A | 6/1999 | Chen et al. ................ 370/487 |
| 5,926,205 | A | 7/1999 | Krause et al. ................ 348/7 |
| 5,956,088 | A | 9/1999 | Shen et al. ................ 348/385 |
| 5,966,120 | A | 10/1999 | Arazi et al. ................ 348/7 |
| 6,006,257 | A | 12/1999 | Slezak ................ 702/219 |
| 6,009,410 | A | 12/1999 | LeMole |
| 6,026,232 | A | 2/2000 | Yogeshwar et al. ......... 395/615 |
| 6,029,045 | A | 2/2000 | Picco et al. ................ 455/5.1 |
| 6,038,000 | A | 3/2000 | Hurst, Jr. ................ 348/845 |
| 6,038,256 | A * | 3/2000 | Linzer et al. ......... 375/240.12 |
| 6,044,396 | A | 3/2000 | Adams |
| 6,137,834 | A | 10/2000 | Wine |
| 6,137,838 | A | 10/2000 | Migayoshi et al. ......... 375/240 |
| 6,141,358 | A | 10/2000 | Hurst, Jr. et al. ............... 348/7 |
| 6,181,711 | B1 | 1/2001 | Zhang |
| 6,208,688 | B1 * | 3/2001 | Seo et al. ............. 375/240.03 |
| 6,240,103 | B1 | 5/2001 | Schoenblum |
| 6,324,519 | B1 | 11/2001 | Eldering |
| 6,359,902 | B1 | 3/2002 | Putzolu |
| 6,370,199 | B1 | 4/2002 | Bock |
| 6,463,585 | B1 | 10/2002 | Hendricks |
| 6,470,079 | B1 | 10/2002 | Benson |
| 6,481,012 | B1 | 11/2002 | Gordon et al. |
| 6,487,721 | B1 * | 11/2002 | Safadi ................ 725/36 |
| 6,529,550 | B1 | 3/2003 | Tahara |
| 6,611,624 | B1 * | 8/2003 | Zhang et al. ............... 382/232 |
| 6,615,039 | B1 | 9/2003 | Eldering |
| 6,665,872 | B1 | 12/2003 | Krishnamurthy |
| 6,704,930 | B1 * | 3/2004 | Eldering et al. ............. 725/36 |
| 2002/0188943 | A1 | 12/2002 | Freeman |

FOREIGN PATENT DOCUMENTS

| | | |
|---|---|---|
| CA | 2303149 | 3/1999 |
| WO | 9911065 | 3/1999 |
| WO | WO9911065 | 3/1999 |
| WO | 9952283 | 10/1999 |
| WO | 9952285 | 10/1999 |
| WO | WO9952283 | 10/1999 |
| WO | WO9952285 | 10/1999 |
| WO | 9966719 | 12/1999 |
| WO | WO9966719 | 12/1999 |
| WO | 0016544 | 3/2000 |
| WO | WO0016544 | 3/2000 |

OTHER PUBLICATIONS

"SCTE Digital Video Subcommittee, Call for Information, Cable Head-end and Distribution Systems", SCTE DVS 089, rev 1, Jun. 16, 1997.

"SCTE Digital Video Subcommittee, Call for Information, VBI and Ancillary Data Services", SCTE DVS 088, rev 1, Jun. 16, 1997.

SCTE DVS/110, Response to SCTE DVS CFI (DVS/089R1): Cable Head-end and Distribution Systems, from Next level Systems, Inc., Sep. 4, 1997, section 6 "Digital Program Insertion & Interfaces", pp. 154-155.

SCTE DVS 112 "Recommendations for New Ad Hoc Group", Joe Davis, Digital Video Systems, New Media Division, Sep. 16, 1997.

SCTE DVS 113 "Digital Program Insertion Comments", Cable Television Laboratories, Inc. ("CableLabs"). Sep. 18, 1997.

SCTE DVS 111 Digital Headend Distribution CFI Response System Description (Digital Broadcast Delivery System), Scientific Atlanta, Inc., Nov. 24, 1997, pp. 54-56.

"Digital Program Insertion for Local Advertising", by Mukta Kar, Ph.D., Majid Chelehmal, Ph.D., Richard S. Prodan, Ph.D. of Cable Television Laboratories, 1998 NCTA TECH PAPER.

"Reducing Compression Concatenation Effects, an Introduction to MOLE Technology", by Adolfo Rodriguez, Director of Marketing, Snell & Wilcox, Aug. 1998.

SCTE DVS 177, "AHG Work Plan", by SCTE DVS Working Group 3, DPI Ad Hoc Group, Sep. 1, 1998.

"Dynamo Mediasplice MPEG2 Seamless Splicing", Viewgraphics Incorporated, Fall (Oct.) 1998.

SCTE- DVS 253 "Digital Program Insertion Cueing Message for Cable", by SCTE Engineering Committee-Digital Video Subcommittee, Sep. 27, 1999.

SCTE Digital Video Subcommittee, Digital Program Insertion Ad Hoc Group, *Business and Operational Dependencies*, Nov. 5, 1997, 2 pages.

SCTE Digital Video Subcommittee, *Digital Program Insertion Comments from CableLabs*, Sep. 18, 1997, 2 pages.

Davis, Joe Digital Video Systems, New Media Division, *Recommendations for New Ad Hoc Group*, Sep. 16, 1997, 4 pages.

SCTE Digital Video Subcommittee, *Digital Program Insertion Requirements*, Mar. 17, 1997, 1 page.

Digital Video Systems, *Technical Issues* Nov. 5, 1997, 5 pages.

Shen, Paul Imedia Corporation, *Imedia CherryPicker™, Router Re-Multiplexer™ for Digital Programming* Jun., 1998, 12 pages.

U.S. Appl. No. 10/049,246, filed Jan. 25, 2002, Hamilton.
U.S. Appl. No. 09/553,637, filed Apr. 20, 2000, Eldering.
U.S. Appl. No. 10/031,268, filed Oct. 19, 2001, Eldering.
U.S. Appl. No. 10/759,620, filed Jan. 16, 2004, Eldering.

"Digital Program Insertion", SCTE DVS078, Mar. 17, 1997.

"Digital Ad Insertion Request for Information", Cable Television Laboratories, Inc. ("CableLabs"), Apr. 28, 1997.

"SCTE Digital Video Subcommittee, Call for Information, Cable Head-end and Distribution Systems", SCTE DVS 089, rev 1, Jun. 16, 1997.

"SCTE Digital Video Subcommittee, Call for Information, VBI and Ancillary Data Services", SCTE DVS 088, rev 1, Jun. 16, 1997.

SCTE DVS/110, Response to SCTE DVS CFI (DVS/089R1): Cable Head-end and Distribution Systems, from Next level Systems, Inc., Sep. 4, 1997, section 6 Digital Program Inser.

SCTE DVS 112 "Recommendations for New Ad Hoc Group", Joe Davis, Digital Video Systems, New Media Division, Sep. 16, 1997.

SCTE DVS 113 "Digital Program Insertion Comments", Cable Television Laboratories, Inc. ("CableLabs"). Sep. 18, 1997.

SCTE DVS 111 Digital Headend Distribution CFI Response System Description (Digital Broadcast Delivery System), Scientific Atlanta, Inc., Nov. 24, 1997, pp. 54-56.

SCTE Digital Video Subcommittee, Digital Program Insertion Ad Hoc Group, Business and Operational Dependencies, Nov. 5, 1997, 2 pages.

Digital Video Systems, Technical Issues Nov. 5, 1997, 5 pages.

Shen, Paul Imedia Corporation, Imedia CherryPicker™, Router Re-Multiplexer™ for Digital Programming Jun., 1998, 12 pages.

* cited by examiner

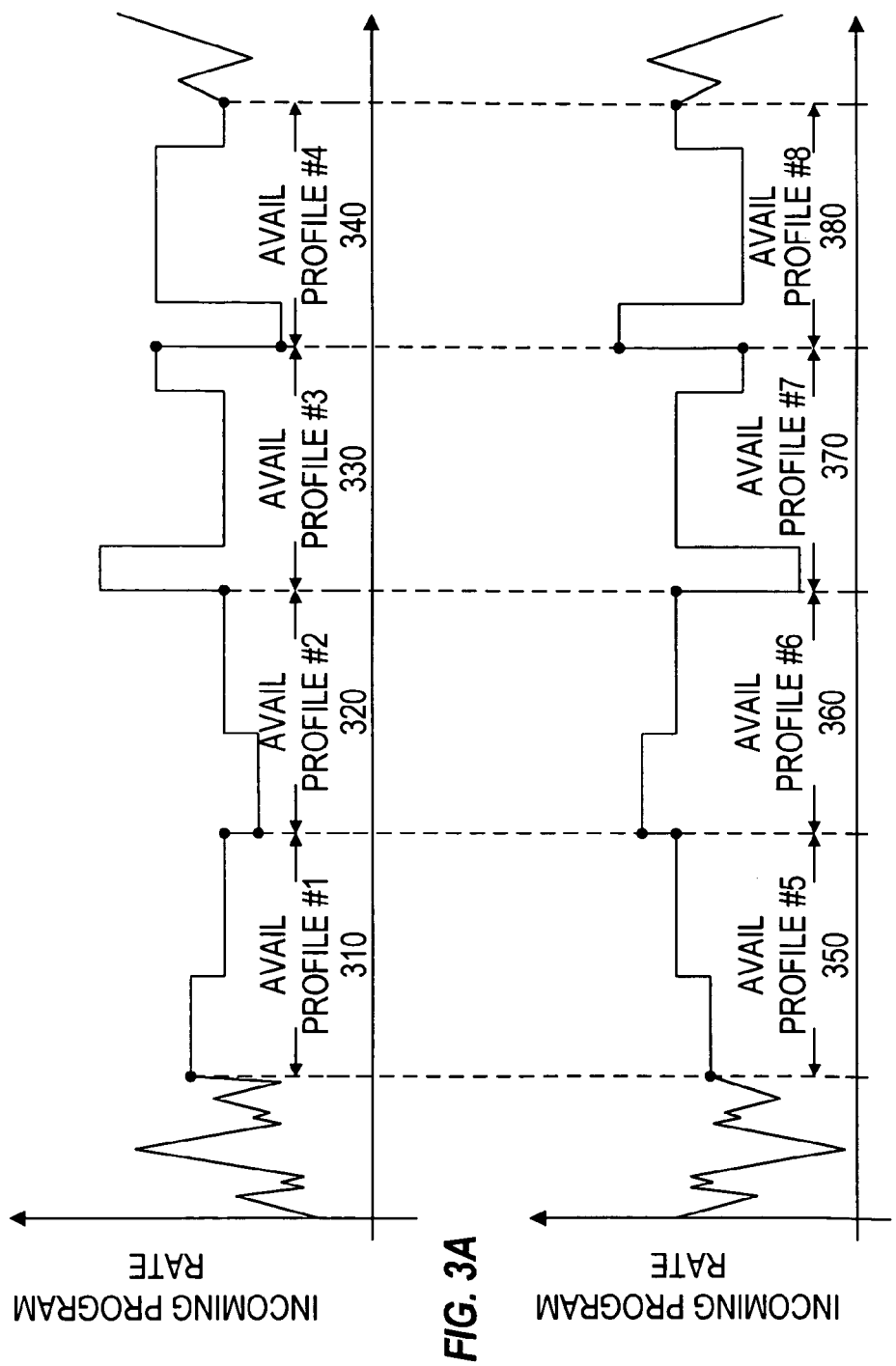

METHOD AND APPARATUS FOR INSERTING DIGITAL MEDIA ADVERTISEMENTS INTO STATISTICAL MULTIPLEXED STREAMS

This application claims priority under 35 U.S.C. §119(e) for provisional application No. 60/160,549 filed on Oct. 20, 1999.

BACKGROUND OF THE INVENTION

The transition to digital video allows video programming to be transmitted in a digital format through satellite systems, cable systems, and over the air broadcast systems. Digital compression, and in particular, the Motion Pictures Expert Group (MPEG) Standard allows for multiple digital programs to be carried in a section of spectrum which previously could only carry one analog program. Typically, the 6 MHz wide channel which carried one analog program can carry six to ten digitally encoded and compressed programs.

As part of the digital transmission process, multiple programs are statistically multiplexed such that the bit rate requirements for each program are met and when programs do not have a high bit rate requirement, other programs can use the available bandwidth. As an example, when a football game is statistically multiplexed with a talk show, the football game will be allocated sufficient bandwidth to permit accurate representation of the play on the field and the motion of the players. The talk show program will be allocated a minimum amount of bandwidth such that the people appearing on the program can be seen clearly. However, in an instance when there is motion in the talk show program as may be the case when the participants on the talk show begin to hurl chairs at one another, the multiplexing process will allocate additional bandwidth to the talk show and in the event that there is a minimum bandwidth requirement in the football game, that bandwidth will be allocated from the football game to the talk show. Clearly, when there are multiple programs, bandwidth can be allocated among all the programs such that the motion can be accurately represented in each program and the overall statistically multiplexed stream optimized.

Several problems arise in statistically multiplexed programs including the difficulty in separating programs and substituting provisional programming. As an example, at a re-transmission point such as a cable television local head end it becomes difficult to remove one program from the statistically multiplexed stream and insert another program. This difficulty arises from the fact that the bandwidth of the program is varying constantly according to the bandwidth tradeoffs achieved by the statistical multiplexing equipment at the origin point.

Another difficulty is the insertion of advertisements into the statistically multiplexed streams. Because the bandwidth of each program is varying, an original advertisement inserted into the program stream at the origin point will have a time varying bandwidth. Inserting another advertisement at the re-transmission point is not readily facilitated in existing systems and equipment because the bandwidth is varying and in some cases not easily discernible by the equipment at the re-transmission point. Because local advertisement insertion is an important part of many broadcast services and generates significant revenue, it is necessary to be able to remove the initial advertisements, which are part of the program stream and substitute new advertisements.

U.S. Pat. No. 5,715,018 entitled "Digital Advertisement Insertion system" issued on Feb. 3, 1998, provides means for digitizing, compressing and storing analog/audio video source information; and decompressing the information to regenerate an analog signal. A method based on this patent includes receiving motion video information from an analog source; digitizing, compressing and storing the received motion video information in a computer data file such that upon decompression, broadcast quality motion video information is obtained; selecting and editing at least a portion of the stored motion video information; decompressing the selected and edited portion of the stored motion video information to obtain broadcast quality motion; and regenerating an analog signal from the selected and edited portion of the stored motion video information; inserting the regenerated analog signal in place of a broadcast signal on a channel at a predetermined time; and providing synchronization of the regenerated analog signal to the broadcast signal.

An apparatus based on this patent includes means for inserting a signal representing motion video information in place of a broadcast signal on a broadcast channel at a predetermined time, and wherein the broadcast channel transmits the motion video information at a field per second rate; means for providing synchronization of the signal representing motion video information to the broadcast signal; a randomly-accessible computer-readable medium for digitally storing in a data file compressed image data for a sequence of digital still images, including an image corresponding to each field of the motion video information to be transmitted in the broadcast channel, such that upon decompression, broadcast quality motion video information is obtained; and a computer including means for editing the sequence of digital still images, means for accessing the sequence at the predetermined time, for decompressing the sequence to obtain broadcast quality motion video information and for generating the signal to be inserted into the broadcast channel from the accessed sequence.

U.S. Pat. No. 5,600,366 entitled "Methods and Apparatus for Digital Advertisement Insertion in Video Programming", issued on Feb. 4, 1997 permits timely and correct switchovers from network programming to local advertising in ways which occur smoothly without disruption in perception to the viewer. Switchovers occur at packet or frame boundaries and are designed to occur upon detection of idle information from a network source. An apparatus based on this patent includes means for receiving externally supplied programming comprising analog video information and embedded tone cues including a pre-roll cue and a roll cue, detecting said tone cues and converting the analog video information to digital video information; means for activating digital video storage in response to one of said tone cues preparatory to initiating playback; and means for initiating playback from said storage in response to detecting an idle condition from said digital video information.

Another apparatus based on this patent includes means for receiving externally supplied programming from a plurality of sources, each source providing programming comprising analog video information and embedded tone cues, and for converting the analog video information to digital video information; storage means for storing a plurality of local programs; common means for monitoring all of said sources to detect one or more tone cues from a source and for preparing said storage means for playback of respective one or more of said local programs to be substituted for said externally supplied programming from a source sending at least one of said one or more tone cues; and means for initiating playback from said storage means of respective one or more of said local programs to be substituted for said externally supplied programming from a source in response to detecting an idle condition from said digital video information of said source.

A method based on this patent includes receiving externally supplied programming comprising analog video information and embedded tone cues including a pre-roll cue and a roll cue, detecting said tone cues and converting the analog video information to digital video information; activating video storage in response to one of said tone cues preparatory to initiating playback; and initiating playback from said recorder in response to detecting an idle condition from said digital video information.

Another method based on this patent includes receiving local digital video programming and providing it to a user; receiving externally supplied analog video programming and embedded tone cues including a return to network cue, detecting said return to network cue; converting said analog video programming to digital video information upon receipt of said return to network cue; and terminating operation of video storage in response to detection of an idle condition in said local digital video programming.

U.S. Pat. No. 5,956,088 entitled "Method and Apparatus for Modifying Encoded Digital Video for Improved Channel Utilization" issued on Sep. 21, 1999 and U.S. Pat. No. 5,862,140 entitled "Method and Apparatus for multiplexing Video Programs for Improved Channel Utilization" issued on Jan. 19, 1999 both provide a method (and apparatus) for increasing channel utilization for a data channel transmitting a multiplex of a set of one or more encoded program streams. Each program stream in said set being decodable by a corresponding decoder. Each corresponding decoder including a corresponding decoder buffer, the decoder buffers having a maximum allowable size. The method comprising selecting encoded pictures to be modified, said selecting according to a criterion, which includes preventing any underflow of any decoder buffer, modifying each said selected encoded picture to form a corresponding modified encoded picture, said modified encoded picture having less data than said selected encoded picture, and transmitting the corresponding modified encoded pictures through the channel in place of the selected encoded pictures. In one embodiment of these patents, modifying deletes each selected encoded picture. In another embodiment of the patents, where the encoded program streams include predictively encoded pictures, selecting selects predictively encoded pictures that are not anchor pictures, and modifying deletes the prediction error data from each said selected encoded picture.

In a further embodiment of these patents, one or more additional data channels are used to send augmentation information. The augmentation information can be used by specially equipped receivers to correct the impairments that would normally occur when decoding the modified signal received from the data channel. In yet another embodiment of the patent, augmentation information is sent using the same data channel that is used to transmit the modified pictures. In this case, the information that is removed by modifying is transmitted before it is needed for decoding and at a time when the data channel is not fully utilized. Certain receivers equipped with sufficient storage can receive and store the augmentation information until it is needed. Alternatively, if the additional storage is used to insert additional delay between the time that data is received and the time that data is decoded, then the augmentation information can be sent after it would be needed by a conventional receiver.

A system of these patents comprise primary and overflow demodulators configured to demodulate data from the primary and overflow channels, respectively; a first demultiplexer, coupled to the primary demodulator, configured to extract a primary packet stream from an output of the primary demodulator; a second demultiplexer, coupled to the overflow demodulator, configured to extract an overflow packet stream from an output of the overflow demodulator; a buffer coupled to the second demultiplexer; a time stamp comparator, coupled to the first demultiplexer and the buffer, configured to compare a time stamp associated with a next packet from the primary packet stream with a time stamp associated with a next packet from the overflow packet stream; and a packet multiplexer, coupled to the first demultiplexer, the buffer and the time stamp comparator, configured to select one of the next packets from the primary packet stream and the overflow packet stream in response to a comparison made by the time stamp comparator.

U.S. Pat. No. 5,029,014 entitled "Ad Insertion System and Method for Broadcasting Spot Messages Out of Recorded Sequence", issued on Jul. 2, 1991, provides an advertisement insertion system and method transmit spot messages during intervals in a broadcast transmission and provide immediate access to stored spot messages, in any sequential order, with a single video source. Custom spot messages can be created by superimposing graphics over selected video signals and simultaneously transmitting those signals with appropriate audio signals.

A system of this patent comprises a first playing means for playing spot messages stored in a recorded sequence on a video source, and control means for switching a broadcast system from program signals of a scheduled broadcast, selecting and causing said first playing means to play into said broadcast system in immediate succession a plurality of spot messages out of said recorded sequence without intervening material from another playing means, and switching said broadcast system back to program signals of a scheduled broadcast.

A method of this patent comprises selecting video, audio and/or graphic signals to form custom spot messages; accessing the selected video signals on a laser disk; accessing selected audio signals which are to be simultaneously broadcast with said accessed video signals; and switching from broadcast transmission to spot message transmission to co-broadcast said accessed video and audio signals as said spot messages with an audio component according to a programmed time schedule and out of a pre-recorded sequence of spot messages on said laser disk.

U.S. Pat. No. 5,966,120, entitled "Method and Apparatus for Combining and Distributing Data with Pre-formatted Real-time Video", issued on Oct. 12, 1999, relates to providing constant bit rate distribution of variable bit rate-encoded video programs, along with Auxiliary Data of a general character, to one or more receivers. At a particular receiver, a customized augmented video program is created by inserting selected portions of the Auxiliary Data into a selected encoded video program. The encoded video portion of the augmented video program can be transmitted, decoded and displayed in real time, while the Auxiliary Data need not be transmitted in real time but can be stored locally at the receiver for real-time presentation at a later time. Real time presentation might include insertion into the video program while non real-time presentation might include insertion into non-video applications separate from the video program.

A method of this patent comprises the steps of receiving the primary data stream; detecting fill data in the primary data stream; inserting an auxiliary data stream in place of the fill data; and adding location data for the programs and for the auxiliary data; to form a modified data stream for distribution to a plurality of receivers configured for individually extracting selected portions of the modified data stream in accordance with the location data.

Another method of this patent comprises the steps of statistically multiplexing a plurality of encoded video programs; monitoring the statistically multiplexed encoded video programs for the occurrence of a fill packet; maintaining a buffer of auxiliary data segments; replacing the fill packet with at least one segment of the auxiliary data stream from the buffer if the segment is smaller than the size of the fill packet; adding location data for the encoded video programs and for the auxiliary data; to form a modified data stream for distribution to a plurality of receivers configured for individually extracting selected portions of the modified data stream in accordance with the location data.

A system of this patent comprises a program multiplexer for statistically multiplexing a plurality of encoded video programs to the modified data stream; a data insertion controller coupled to receive a multiplexed program stream from the program multiplexer and for inserting auxiliary data therein to yield a modified data stream; and a program map insertion controller coupled to receive the modified data stream for adding location data for the encoded video programs and for the auxiliary data to the modified data stream. Another system comprises a multiplexer for statistically multiplexing a plurality of encoded video programs; a first controller for adding auxiliary data to the output of the multiplexer; a second controller for adding location data for the encoded video programs and for the auxiliary data to the output of the first controller, thereby forming a modified data stream; a distribution channel for distributing the modified data stream to at least one receiver; a processor for determining location data from the distributed modified data stream; a first demultiplexer for selecting an encoded video program from the modified data stream in accordance with a first predetermined characteristic of the processor and the location data; a second demultiplexer for selecting local auxiliary data from the modified data stream in accordance with a second predetermined characteristic of the processor and the location data; a storage device for storing the local auxiliary data from the second demultiplexer; and an augmentation unit for associating the encoded video program and the stored local auxiliary data to form a receiver-specific augmented video program for decoding and display.

SUMMARY OF THE INVENTION

The present invention provides a system and method for computing rate profiles associated with the multiplexed program streams. The rate profiles may be used for inserting local advertisements and allowing substitution of original advertisements or other programming with inserted advertisements. In one embodiment, a predetermined bit rate profile is specified for the compression of an advertisement with the specification extending from the start point of the advertisement to the end point. The digital media advertisement is compressed according to the specified profile and inserted into the advertising opportunity.

The predetermined bit profile may comprise a maximum bit rate, a maximum bit rate and a minimum bit rate, a minimum or maximum number of bits over the avail or a subset or portion of the avail, or a time varying profile defined from the start point to the end point. The profile may be modeled as a piece-wise linear model, allowing bandwidth to change at specified moments during the advertisement.

The specified predetermined bit rate profile may comprise only a minimum bit rate and null packets may be inserted to make up the difference between the minimum bit rate and the actual bit rate which occurs in the statistically multiplexed stream.

In a statistically multiplexed stream where there are multiple programs with varying bit rates for each program, multiple bit rate profiles may be defined such that each advertising opportunity has a specific bit rate profile defined for it. The individual rate profiles may be defined such that the sum of all the profiles is equal to the maximum allowed bit rate in the statistically multiplexed stream during the advertisement. The predetermined bit rate profile for the stream may specify the instantaneous sum of the first bit rate profile and the second bit rate profile or may simply define the total number of bits from the start point to the end point of the first bit rate profile summed with the second bit rate profile.

In inserting advertisements in various multiplexed program streams, it is possible to create the bit rate profiles for the individual advertisements such that they are complementary. That is, the high bandwidth portions of the first bit rate profile correspond to the low bandwidth portions of the second bit rate profile. This method can be extended across multiple profiles such that high bandwidth portions of an advertisement correspond with at least one low bandwidth portion in another program stream, thus allowing for multiple simultaneous high bandwidth portions of advertisements. Alternatively, high bandwidth portions of advertisements may be staggered in a predetermined manner such that ads are allowed to have sections of high motion or other high bandwidth requirements but that these portions do not occur simultaneously.

These and other features and objects of the invention will be more fully understood from the following detailed description of the preferred embodiments, which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 3A and 3B illustrate the time varying bit rates for two statistically multiplexed streams having complementary advertisement avails;

DETAILED DESCRIPTION OF THE PREFERRED EMBODIMENT

Figure 1:
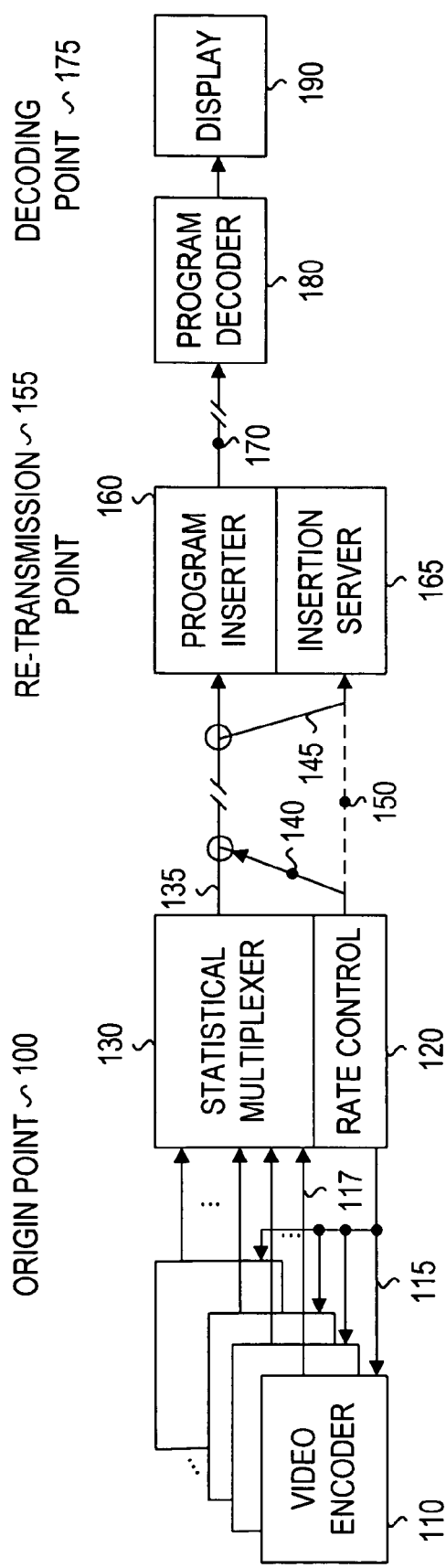
FIG. 1 is a block diagram illustrating an exemplary processing associated with the generation of statistically multiplexed streams.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 6 in particular, the system and method of the present invention is disclosed.

FIG. 1 illustrates an exemplary processing associated with the generation of statistically multiplexed program streams. As illustrated, each video encoder 110 produces a video programming stream 117 which is received by the statmux 130. The statmux 130 includes a rate control unit 120, which provides a rate control signal 115 to each video encoder 110. This rate control signal 115 is used by the video encoder 110 to compress the programming according to the requirements of the statmux 130. The statmux 130 acts to control the total bandwidth utilized by the multiple video encoders 110. The actual number of video encoders will be determined by the amount of bandwidth available to the statistical multiplexer 130.

The origin point 100 for the video may be a studio location, a satellite uplink location, a cable centralized transmission point, in-home server, or other video origin point.

Once the statmux 130 creates a statistical multiplexed stream 135, it is transmitted to the re-transmission point 155. Rate control information may be transmitted as part of the statistically multiplexed stream 135 through use of an inserted rate control signal 140 which is combined with the programming. Alternatively, the rate control information may be transmitted as a separate rate control signal 150 that may be reinserted through use of a rate control reinsertion signal 145. In another embodiment, rate control information may be transmitted only as MPEG video rate parameters.

The re-transmission point 155 may comprise a cable television head end, a satellite downlink receiver, or can even be home equipment such as a television set top, personal computer, or other equipment, which receives the statistically multiplexed stream 135.

At the re-transmission point 155, a program inserter 160 works in conjunction with an insertion server 165 to reform the program streams with substituted advertisements. This new program stream comprises the outgoing program stream multiplex 170. The outgoing program stream multiplex 170 is received by a decoding point 175 that includes a program decoder 180, which decodes the digital video stream and presents it to a display unit 190. In one embodiment, the program decoder comprises an MPEG decoder and is coupled to a television which acts as display 190. In another embodiment, the program decoder 180 comprises another type of digital video decompression system and is coupled to a personal computer or other display device.

From a business perspective, the fact that advertisements have been inserted into what are termed "ad avails" creates difficulty at the re-transmission point 155 because the advertisement may not be suitable for the viewers in that geographic area, the service provider may be able to receive more revenue by substituting the original advertisement with a new advertisement. As an example, it may be desirable for a cable operator to replace a nationally broadcast advertisement with a local advertisement for a restaurant, car dealership, or other locally provided service. If the cable operator had permission to substitute the ads, they will want to remove the original advertisement from the programming stream and substitute the local advertisement. The term "ad avail" refers to any available spot for advertising which may be filled with an original advertisement or a blank spot in the programming. Alternatively, it may be possible to interrupt the program stream and insert an advertisement where there was no original advertisement. In this case, the "ad avail" becomes created although it did not originally exist.

The rate control signal 115 may contain rate control information as well as insertion timing information to enable program and advertisement insertion at re-transmission points 155. The information which may be included consists of the minimum or actual rate during the avails as determined by predefined rate profiles, or the actual rate profile of the upcoming avail in predefined or specified time units. The rate control signal 115 may indicate a fixed minimum rate which may be different during each ad avail and/or the total number of bits, bites, packets, or other measurable units in the ad avail.

The separate rate control signal 150 as illustrated in FIG. 1 serves as a means of delivery for rate information and can include prearrangement by any means including e-mail, written or verbal specifications, or templates designated by a standards body, or an actual out-of-band or out-of-multiplex transmission which represents the specific rate control information.

Figure 2B:
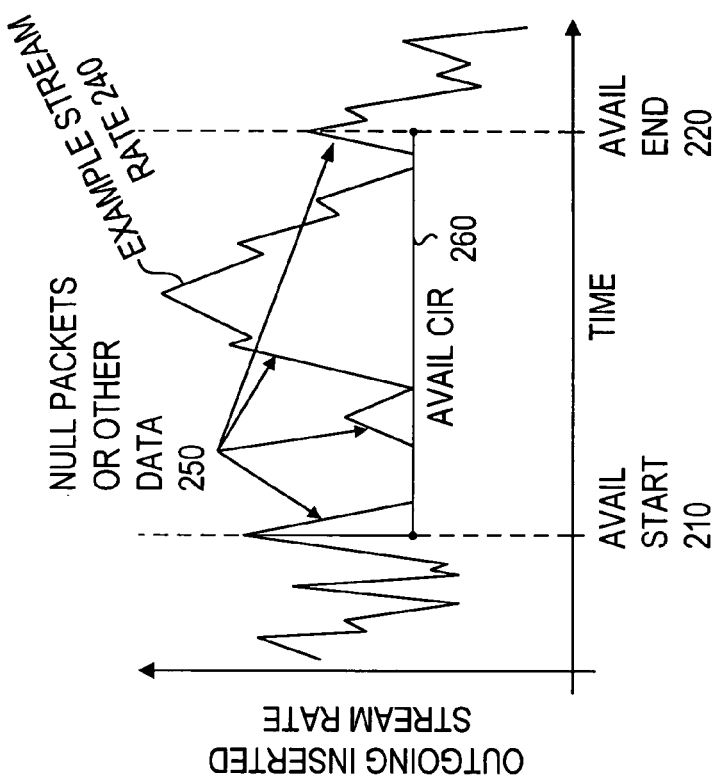
FIGS. 2A and 2B illustrate the time varying bit rates for an incoming program stream and an outgoing stream with inserts respectively.
Figure 2A:
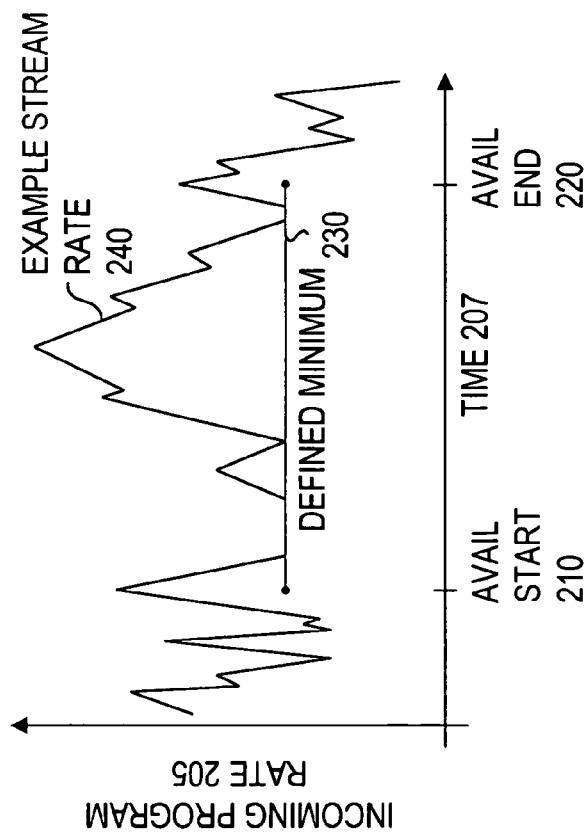

FIG. 2A illustrates time varying bits associated with an incoming program stream. Incoming program rate 205 is drawn on Y axis and time 207 is drawn on X axis. The illustration of the incoming program rate 205 as compared to function of the time 207, illustrates that a defined minimum 230 over a pre-determined period of time may be determined. The predetermined time period may have an associated avail start 210, avail end 220, and an example rate 240. Thus, the incoming program stream has a bit rate which varies and exceeds the defined minimum 230 for the avail having avail start 210 and avail end 220. Thus, the underlined program may actually utilize more bandwidth than the avail, but the avail will be assigned the minimum defined bandwidth 230.

FIG. 2B illustrates the time varying bit rates for an outgoing stream. FIG. 2B further illustrates an avail committed information rate (CIR) 260 which is the minimum bit rate that will be guaranteed for use for the insertion of the advertisement in the avail. As shown in FIG. 2B, one or more null packets 250 can be inserted to make up the difference between the CIR 260 and the actual bit rate as defined by the example stream 240.

For exemplary purposes, FIGS. 3A and 3B illustrate exemplary statistically multiplexed streams having predefined avail rate profiles. FIG. 3A represents a first stream in a multiplex, and FIG. 3B represents a second and simultaneous stream in the same multiplex. As illustrated in FIGS. 3A and 3B, a number of avail profiles are specified including avail profile #1 (310); avail profile #2 (320); avail profile #3 (330); avail profile #4 (340); avail profile #5 (350); avail profile #6 (360); avail profile #7 (370); and avail profile #8 (380). As illustrated, avail profile #1 (310) may be complementary to avail profile #5 (350) in that these avail profiles occur simultaneously in the multiplexed stream. This may be the case when the advertisements are synchronous such that the start times are equal or nearly equal and the end times are equal or nearly equal. In such a case it is possible to define the avail profiles such that they complement each other to allow for a defined rate for multiple simultaneous profiles in a single multiplex wherein high bandwidth requirements are permitted at a time in avail profile #1 (310) which is complementary to the high bandwidth requirement time in avail profile #5 (350).

Figures 4A, 4B, 4C:
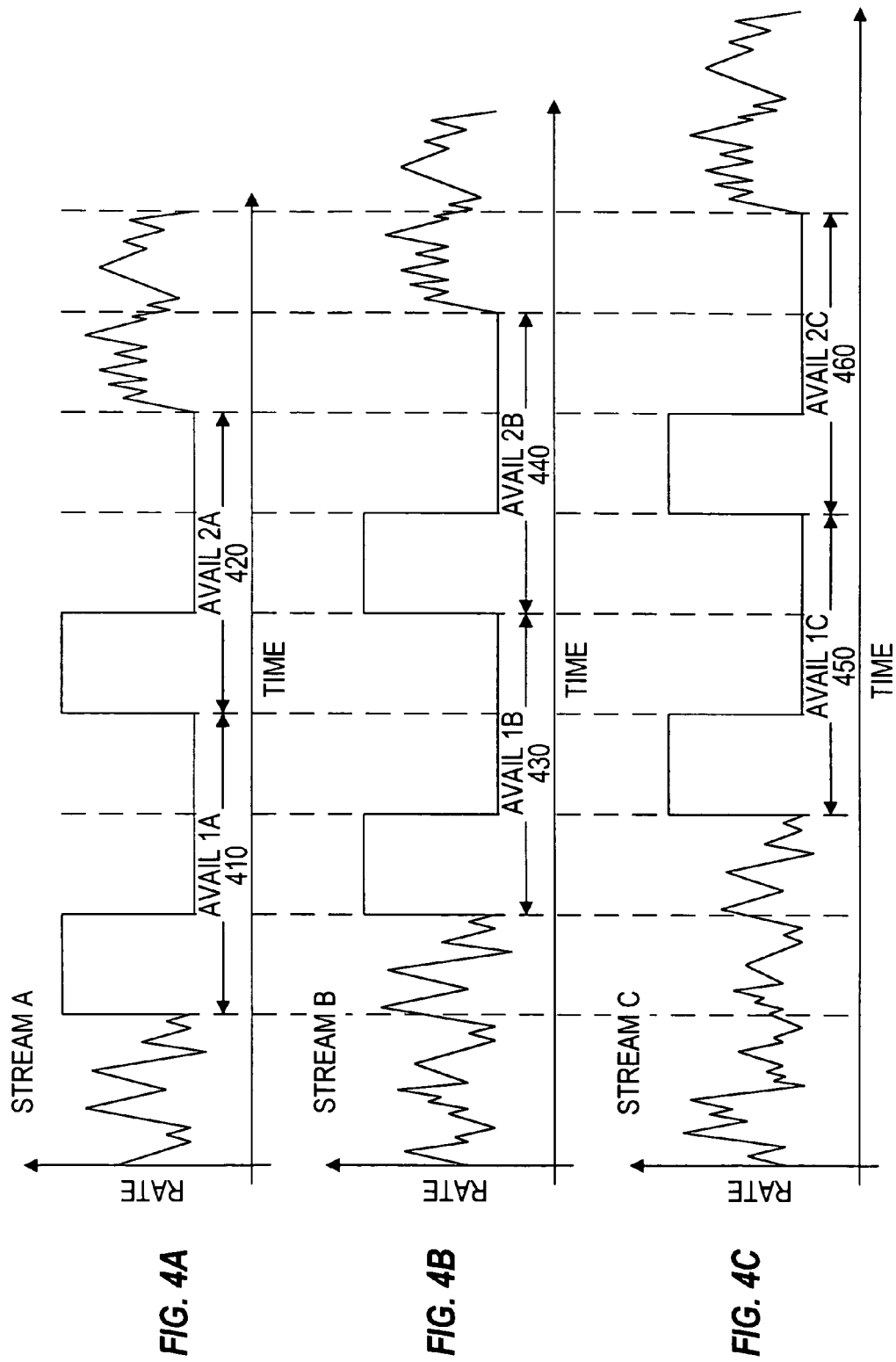
FIGS. 4A–4C illustrate staggered avail profiles for three simultaneous multiplexed streams.

FIGS. 4A–4C represent avails in three program streams in a multiplexed signal. As shown, several avails are defined including avail 1A 410, avail 2A 420, avail 1B 430, avail 2B 440, avail 1C 450 and avail 2C 460. The profiles for these avails are defined such that the high bandwidth times are staggered.

Figure 5:
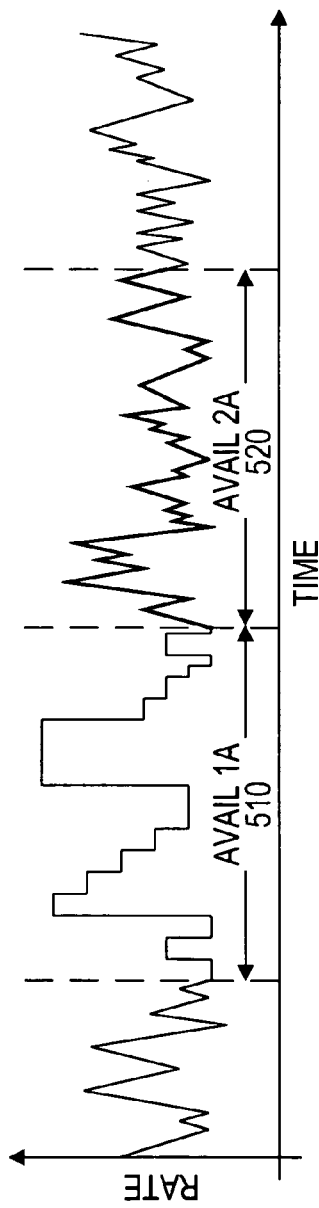
FIG. 5 illustrates two profiles having coarse granularity and fine granularity respectively.

FIG. 5 illustrates custom profiles including avail 1A 510 and avail 2A 520 with profiles defined such that avail 1A has a coarse custom profile with the bit rate varying over time substantially. Avail 2A 520 has a fine time granularity for definition of the rate such that the defined bit rate may vary dramatically over a period as short as a second or several milliseconds. This method allows for the bandwidth in the statistically multiplexed stream to be utilized optimally such that when the initial advertisement is removed the inserted advertisement has a bit rate which matches that of the original advertisement closely.

Figure 6:
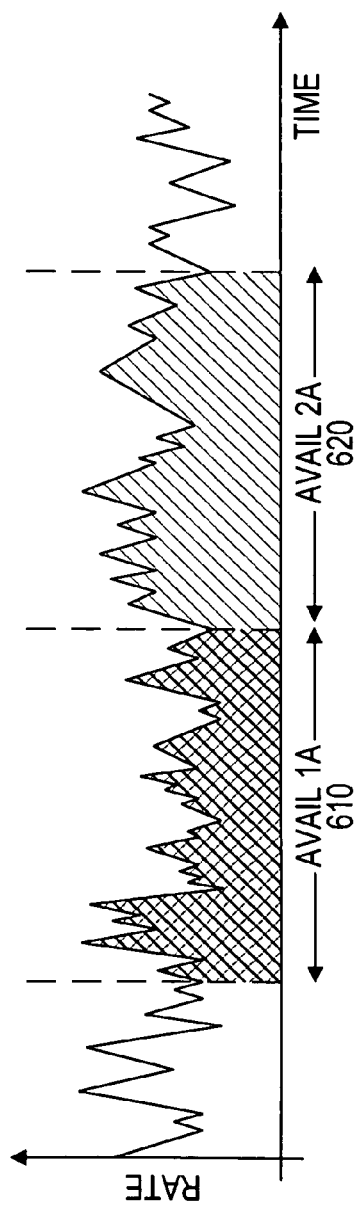
FIG. 6 illustrates monitoring of the total number of bits during the avails.

FIG. 6 illustrates monitoring of avail 1A 610 and avail 2A 620 such that the total number of bits, packets, or other digital measurement is calculated. This can be visualized as the area under the rate curve. By specifying the total number of bits, short avails can be defined and streams can be defined for decoders with large buffers.

It is to be noted that a typical MPEG buffer has a latency of less than 1 second. Thus, the sections of video must be delivered and used within that time. However, the decoders with larger buffers, as may be included in equipment with large amounts of memory, such as set top devices, may define a 30 second latency and allow bits to be delivered at any time in the 30 second window. Such large buffers can provide additional flexibility in advertisement insertion. One way in which a large buffer can be used is by using the memory to buffer the video stream of the avail, allowing low bit rate delivery of high bit rate ads, and inserting the ads at the appropriate moment. Thus, although the statistically multiplexed video stream may not be capable of transporting a high bit rate advertisement for real time display, the system may receive the advertisement over a period of several seconds and subsequently display the high bit rate advertisement.

The extensions of the techniques disclosed herein can be utilized and include concepts such as profiling of avails which includes profiling of portions of the pre-advertisement and post-advertisement content. For example, by profiling the start/end of television shows it becomes possible to allow higher bit rate and/or higher quality advertisements, based on the occurrence of low bit rate segments of television programming in adjacent channels. When the start/end of programming in an adjacent channel results in a low bit rate and the avail overlaps this start/end segment, the bandwidth from the programming can be used for the avail. For example, ads on channel 2 can benefit from rolling credits on channel 3 at the end of the show on channel 3 when the end time of the programs on channels 2 and 3 are staggered, as frequently occurs.

Another technique which can be utilized as part of the present invention is blind profiling, in which no external rate information other than the MPEG rate values in the video stream is transmitted to the insertion point, which in one embodiment, is the statistical multiplexer 130. At the insertion point, the insertion device optimizes use of the avail bits, and profiles are created based on the ads which originate from off-line encoders, with the statistical multiplexing process allowing optimal use of bits for the highest quality and full control over the images. The resulting profiles can be transmitted in the inserted rate control signal 140 or through use of the separate rate control signal 150.

In the blind profiling technique, the secondary insertion point 155, which in one embodiment is the retransmission point, utilizes the profiles of the original ads as the basis for compressing or re-compressing replacement ads, which will be forced to match the profiles of the original ads. One advantage of this technique is that it allows for the coexistence of both profiled and unconstrained ads in which the statistical multiplexer 130 accommodates the advertisement in its original form, using traditional statistical multiplexing techniques for compression. The profiles created by the first instance of compression can be piecewise linear profiles with the linear segments extending periods of one second or longer, minimum or maximum bit rate profiles, high granularity profiles which track the bandwidth allocated to the avail in increments ranging from a few milliseconds to one second or more, or total bit rate profiles.

Another advantage of blind profiling is that at the initial insertion point, the profile of the avail is only constrained by the statistical multiplexing process and not by a predetermined profile. Using this technique, it is possible for content providers to sell avails and insert the advertiser's material while insuring a high quality advertisement. The local broadcaster, using the profile generated by the initial insertion, can substitute the original advertisement with another advertisement which matches the profile. The substituted advertisement may have a profile which approximates that of the original advertisement, or may be compressed or re-compressed to match or approximate the profile of the original advertisement.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for inserting advertisements into a statistically multiplexed transmission stream containing a plurality of program streams with a plurality of advertising opportunities, the method comprising:

determining a first avail rate profile for a first avail within a first program stream, wherein the first avail rate profile is based at least in part on a first program stream rate profile for the first program stream;

determining a second avail rate profile for a second avail within a second program stream, wherein the second avail rate profile is based at least in part on a second program stream rate profile for the second program stream;

generating a composite avail rate profile based on the first avail rate profile and the second avail rate profile;

assigning a first advertisement rate profile to the first avail and a second advertisement rate profile to the second avail, wherein the first advertisement rate profile is not limited by the first avail rate profile and the second advertisement rate profile is not limited by the second avail rate profile, and wherein a combined first advertisement and second advertisement rate profile is limited by the composite avail rate profile;

compressing the first advertisement according to the first advertisement rate profile and the second advertisement according to the second advertisement rate profile; and inserting the compressed first advertisement in the first avail and the second advertisement in the second avail.

2. The method of claim 1, wherein the composite avail rate profile specifies the instantaneous sum of the first avail rate profile and the second avail rate profile.

3. The method of claim 1, wherein the first advertisement rate profile is complementary with the second advertisement rate profile.

4. The method of claim 1, wherein the first advertisement rate profile has a first high advertisement rate portion, the second bit rate profile has a second high bit rate portion, and the first high bit rate portion and the second high bit rate portion are staggered.

5. A system for inserting advertisements into a statistically multiplexed transmission stream containing a plurality of program streams with a plurality of advertising opportunities, the system comprising:

- a statistical multiplexer capable of determining a first avail rate profile for a first avail within a first program stream and a second avail rate profile for a second avail within a second program stream;
- a video compressor capable of compressing a first advertisement and a second advertisement at an aggregate rate profile which is less than or equal to sum of the first avail rate profile and the second avail rate profile; and
- a video inserter capable of inserting the compressed first advertisement in the first avail and the second compressed advertisement in the second avail.

6. The system of claim 5, wherein said video compressor compresses the first advertisement at the first avail rate profile and the second advertisement at the second avail rate profile that is complementary with the first avail rate profile.

* * * * *

UNITED STATES PATENT AND TRADEMARK OFFICE
CERTIFICATE OF CORRECTION

| | | |
|---|---|---|
| PATENT NO. | : 7,068,724 B1 | Page 1 of 1 |
| APPLICATION NO. | : 09/694848 | |
| DATED | : June 27, 2006 | |
| INVENTOR(S) | : Jeffrey Hamilton | |

It is certified that error appears in the above-identified patent and that said Letters Patent is hereby corrected as shown below:

1. Column 8, line 23, delete "bites" and replace with --bytes--;

Signed and Sealed this

Twenty-sixth Day of December, 2006

JON W. DUDAS
*Director of the United States Patent and Trademark Office*